United States Patent [19]

Nordvall et al.

[11] Patent Number: 4,763,532

[45] Date of Patent: Aug. 16, 1988

[54] OVERLOAD PROTECTION IN TRANSDUCERS FOR MEASURING TORQUE

[75] Inventors: Jan O. Nordvall; Christer Aminder, both of Västerås, Sweden

[73] Assignee: ASEA Aktiebolag, Västerås, Sweden

[21] Appl. No.: 7,457

[22] Filed: Jan. 28, 1987

[51] Int. Cl.⁴ .............................. G01L 3/04
[52] U.S. Cl. ................................ 73/862.32
[58] Field of Search .......... 73/862.22, 862.32, 862.33, 73/862.34, 862.35, 862.36

[56] References Cited

U.S. PATENT DOCUMENTS 1,354,698 10/1920 Shallcross ............ 73/862.33
4,432,245 2/1984 Hattori et al. ......... 73/862.32
4,506,554 3/1985 Blomkvist et al. .

FOREIGN PATENT DOCUMENTS 6838 1/1985 Japan ..................... 73/862.08
167387 6/1959 Sweden .
717574 2/1980 U.S.S.R. ................. 73/862.34

Primary Examiner—Charles A. Ruehl
Attorney, Agent, or Firm—Watson, Cole, Grindle & Watson

[57] ABSTRACT

A torque transducer which is constructed so as to be protected from an overload includes a measuring axle which extends through a housing and a take-up axle which also extends through the housing in parallel with the measuring axle. The portion of the measuring axle within the housing includes two spaced apart gear wheels which are respectively engaged with backlash with gear wheels on the take-up axle, the gear wheels on the measuring axle being larger in diameter than the gear wheels on the take-up axle. When the measuring axle is subjected to excessive torque, such that the portion thereof within the housing twists sufficiently, the gear wheels on the measuring axle will engage with the gear wheels on the take-up axle to transfer the excessive torque to the take-up axle.

1 Claim, 1 Drawing Sheet

OVERLOAD PROTECTION IN TRANSDUCERS FOR MEASURING TORQUE

TECHNICAL FIELD

The invention relates to a mechanical overload protection device for transducers for measuring torque in primarily rotating axles.

BACKGROUND ART, PROBLEMS

Transducers for measuring the torque in rotating axles are designed according to different principles. In some transducers the twist of the axle is measured over a certain axial length as the phase difference between the signals from two gear rings. In other transducers, the shearing stress in the axle is measured by different methods, for example by means of strain gauges, whereby the strain gauge and the signal processing circuit, mounted on the axle, are supplied via a rotating transformer and where the measuring signal is transmitted in a wireless manner.

In still other transducers, the shearing stress is measured by magnetoelastic methods, such as, e.g., in Swedish Pat. No. 167 387, in which the magnetic anisotrophy in the axle, caused by the shearing stress, is measured with the aid of a system of magnetizing and sensing magnetic poles arranged around the axle.

In a magnetoelastic transducer according to U.S. Pat. No. 4,506,554, a measuring axle is provided with a measuring sleeve which, in two separate zones, has been formed with slots which in one zone has a +45° deviation from the axial direction and in the other zone a −45° deviation from the axial direction. The difference in reluctance between the two zones, arising when applying a torque, is sensed by a surrounding coil system.

In all of the above-mentioned transducers, the wishes concerning the choice of stress level in the measuring axle at the upper limit of the measurement range are contradictory. To obtain a good signal/noise ratio and a small temperature dependence, a high maximum measuring stress should be chosen, but to obtain a good overload capacity without the zero point of the signal being changed, a low maximum measuring stress must be chosen, and therefore the signal/noise ratio and the temperature dependence are necessarily deteriorated.

DISCLOSURE OF THE INVENTION

As will have been clear from the above, in prior art trransducers there is a conflict between the demand for a high measuring stress in the axle to obtain a good signal/noise ratio as well as a low temperature dependence and the demand for a low measuring stress in the axle to obtain a good overload capacity. This conflict is eliminated according to the invention by constructing the measuring axle with such slender dimensions that the maximum measuring stress is satisfactory while at the same time achieving a high overload ability by allowing—at a certain twist of the measuring axle—a stronger structural member to assume the greater part of the torque.

DESCRIPTION OF A PREFERRED EMBODIMENT

Figure 1:
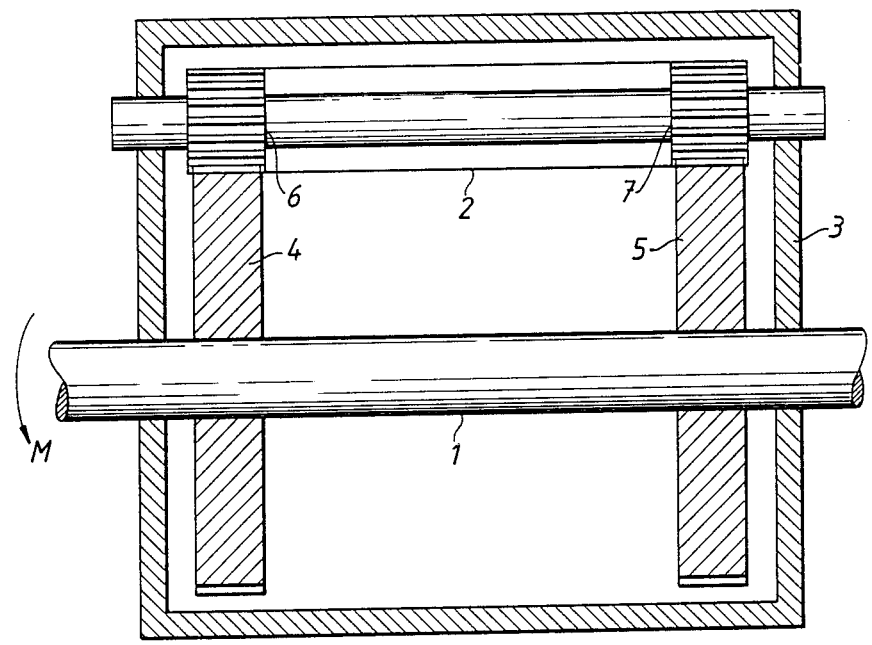
FIG. 1 shows a device according to the invention which, when the measuring axle is loaded above a certain limit, takes over the greater part of the excess load.

In the preferred embodiment of the invention shown in FIG. 1, the torque-loaded measuring axle 1 and the heavier structural member which is to take up the main part of the overload, in this case in the form of a second axle 2, are illustrated. The second axle 2 is mounted in a housing 3, which is suitably journalled riding on the measuring axle 1. The housing 3 is thus prevented from rotating by means of a link to a fixed point (not shown). On the measuring axle 1 two larger gear wheels 4 and 5 are attached, without backlash, at such a distance from one another that a reasonable twist between the gear wheels is obtained when the maximum measuring load has been exceeded, and so as to permit satisfactory space between the gear wheels to accomodate a torque transducer, for example according to the above-mentioned U.S. Pat. No. 4,506,554.

On the second axle 2, the overload axle, two smaller gear wheels 6, 7 are arranged without backlash, preferably milled out directly in the axle 2. These gear wheels 6, 7 are in engagement with the respective gear wheels 4, 5 with a well-controlled total backlash. This backlash is dimensioned so as to be eliminated by a twist of the measuring axle 1 between the gear wheels 4, 5 upon a torque which, with a satisfactory margin, exceeds the maximum measuring torque. If FIG. 1 were a reproduction on a 1:1 scale, the total backlash would be about 1 mm, of which 0.5 mm would be in either torque direction. A practicable backlash may be as small as ±0.1 mm.

Figure 2:
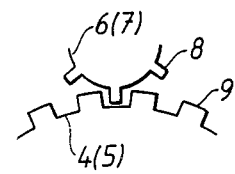
FIG. 2 shows an alternative embodiment of the engagement of teeth between two gear wheels in FIG. 1 to obtain a controllable backlash.

The backlash may be distributed equally between the two engagements of teeth. To facilitate adjusting the correct neutral position, so as to obtain the same backlash in both torque directions, either of the engagements 4, 6 or 5, 7 can be made as free from backlash as possible and the other engagement of teeth can be made as shown in FIG. 2 with thinner teeth 8 in the gear wheels 6, 7 of the overload axle than the corresponding teeth 9 in the gear wheels 4, 5 of the measuring axle 1.

The second axle 2, the overload axle, is described above as the stronger structural member which is to take over the major part of the overload. However, in FIG. 1 this axle is shown with only insignificantly larger diameter than that of the measuring axle 1. The fact that this is satisfactory is due to the fact that, when the backlash has been eliminated upon an overload, the torque in the second axle 2 is geared down. With a relationship between the gear wheels as shown in FIG. 1, the torque is geared down to about one-fourth, resulting in insignificant twisting of the second axle 2. The additional load on the measuring axle 1, caused by the overload, is therefore very insignificant.

We claim:

1. A torque transducer which is constructed such that it is protected from an overload, said torque transducer comprising a housing, a first axle for measuring torque up to a certain maximum value which extends through said housing, the portion of said measuring axle extending within said housing defining a measuring distance, first and second gear wheels located in spaced apart fashion and without backlash on said first axle near opposite ends of said measuring distance, a second axle rotatably journalled within said housing in parallel with said first axle, and third and fourth gear wheels located in spaced apart fashion and without backlash on said second axle and in engagement with said first and second gear wheels, respectively, said third gear wheel having a smaller diameter than said first gear wheel and engaging said first gear wheel with a certain backlash and said fourth gear wheel having a smaller diameter than said second gear wheel and engaging said second gear wheel with said certain backlash, such that when torque in excess of said certain maximum value is applied to said first axle, thus causing the portion of the first axle housing to become sufficiently twisted, the backlash between the first and second gear wheels and the third and fourth gear wheel, respectively, will be eliminated and the excessive torque on the first axle will become relieved.

* * * * *